Oct. 17, 1967 GOJI UCHIKOSHI 3,347,996

CONTROL SYSTEM FOR A MAGNETIC RECORDER

Filed Oct. 25, 1963 5 Sheets-Sheet 1

CONTROL SYSTEM FOR A MAGNETIC RECORDER

Filed Oct. 25, 1963 5 Sheets-Sheet 4

3,347,996
Patented Oct. 17, 1967

3,347,996
CONTROL SYSTEM FOR A MAGNETIC RECORDER

Goji Uchikoshi, 582—33 Gakuen Higashi-machi, Kodaira, Tokyo, Japan

Filed Oct. 25, 1963, Ser. No. 319,057
Claims priority, application Japan, Oct. 27, 1962, 37/47,829
3 Claims. (Cl. 179—100.2)

ABSTRACT OF THE DISCLOSURE

A control system for a magnetic recorder in which operating demands are processed in logic circuits which selectively control the recorder tape-drive mechanism, record and play back amplifiers, record-erase oscillator and level switching circuits. Operating demands of "play," "rewind," "fast forward" and "stop" are each applied to a pair of bistable multivibrators. The output signals from the multivibrators are conducted to a pair of AND gates each of which yields an output signal which is related to the respective states of the multivibrators. One of these signals is amplified and controls the rewind relay. The other signal is applied to a NOR circuit and is then amplified and applied both to the recorder brake solenoid and through a "record" switch to a third multivibrator whose output controls the recorder oscillator. This amplified signal is also applied to a second NOR circuit, the output of which is conducted both to the playback amplifier and also through amplifier means to the tape drive system solenoid. This latter signal is also applied to the third multivibrator to control level meter switching. In operation of the apparatus, the said pair of multivibrators is set in accordance with the current operating demand whereupon the AND gates and NOR circuits selectively call into operation the required recorder function.

The present invention relates to an improved control system whereby the operation of a magnetic recorder can be remotely and precisely controlled, and more particularly to an improved control method which controls various functions of a magnetic recorder such as "play back," "record," "fast forward," "rewind" and "stop" by means of binary signals, and an apparatus for carrying out the method.

In most prior art magnetic recorders, various mechanisms for performing "play back," "record," "fast forward," "rewind" and "stop" had to be individually and manually operated by means such as a lever or mechanical push button. In these prior art magnetic recorders, since the levers or push buttons had to be manipulated by hand, the above mentioned various mechanisms could not perform their designated functions smoothly and the manipulation of such mechanisms were complicated. Furthermore, it was impossible to remotely control the various functions of such magnetic recorders in a satisfactory way. Notwithstanding, in some applications of the magnetic recorders, for instance, when the recorders are employed in broadcasting and concerts, the necessity of remote control for the magnetic recorders is keenly felt. In order to meet such requirement, hithertofore, the relay circuit system for remotely controlling the magnetic recorders has been proposed. Although the relay circuit system can be easily operated and remotely controlled thereby to meet the above mentioned requirements called for magnetic recorders, such system has inherent disadvantages that since this system employs a number of relays, the relay circuit becomes complicated, and that there will be frequent damages occurring at the relay contacts, and furthermore, that such a control device becomes exceedingly expensive. Because of such defects the relay circuit type control device has not been fully developed as a practical device for controlling the magnetic recorder.

Accordingly, one object of the present invention is to provide an improved control system which can positively control various functions of a magnetic recorder while eliminating the necessity of the prior art relay circuit which is expensive and easily subject to damage, and which is relatively less expensive and easy to operate.

According to the present invention, an improved control method for a magnetic recorder which comprising applying signals for indicating various actions such as "play back," "fast forward," "rewind" and "stop" from a key board to a pair of bistable multivibrators to be memorized thereby, applying said memorized signals to a logical circuit comprising a AND circuit and a NOR circuit as a number of combinations of output signals, selecting one or more desired combinations of the output signals by means of said logical circuit, controlling one or more mechanism selected from various mechanisms designed to effect "play back," "record," "fast forward," "rewind," and "stop," respectively, in accordance with the selected combination or combinations of output signals, and actuating a play back level meter switching circuit and/or a recording level meter switching circuit simultaneously with the actuation of the "play back" and/or "record" mechanism in case said selected combination or combinations of signals relate to "play back" and/or "record" is provided.

The most important advantage obtained by the present invention is that said key board is provided with five push button switch type keys such as a play back key, a record key, a fast forward key, a rewind key and a stop key each of which is designed to supply one specific signal of the above mentioned signals for said five types of actions and only the opening and closing of the contacts of said various keys can control the magnetic recorder and its associated devices, and accordingly, the manipulation of the control device is quite simple, and furthermore, since the key board may be installed at a location remote from the magnetic recorder, the magnetic recorder may be remotely controlled.

Another advantage of the present invention is that by the provision of a logical circuit in the control circuit for a magnetic recorder, even when the five keys of the key board are actuated in any desired sequence, the magnetic recorder and its associated devices can be promptly and precisely controlled without causing any damages thereon.

A further advantage of the present invention is that when the tape changes its running condition from the "rewind" or "forward" run at which the tape runs fast to the "play back" or "stop" at which the tape runs slowly or does not run, the monostable multivibrator is caused to apply an inhibit signal to the first NOR circuit for predetermined period which NOR circuit in turn halts the operation of its succeeding mechanisms and accordingly, even the play back key is depressed while the tape is running fast, the tape will not be placed under any excessive tension. This advantage is conspicuous when the magnetic recorder is operated for automatically repeated playing of music.

Furthermore, in the control system of the present invention, since the recording amplifier control circuit is provided in a stage disposed backwardly of the level meter switching circuit, even when the recording amplifier is not operating the recording level can be detected. Accordingly, as compared with the conventional control system in which after the recording amplifier has initiated its operation, the recording level is adjusted while the recording is going on the novel control system enables to record at a previously adjusted suitable recording level.

The above and the further objects and advantages of the present invention will be apparent from the following description of a specific preferred control circuit system for a magnetic recorder embodying the invention.

In the accompanying drawings:

FIGS. 4 through 8 show in details various circuits which constitute the logical diagram of FIG. 2 in which FIG. 4 is a bistable multivibrator circuit, FIG. 5 is a monostable multivibrator circuit, FIG. 6 is an AND circuit, FIG. 7 is a NOR circuit, and FIG. 8 is a power transistor circuit.

Figure 1:
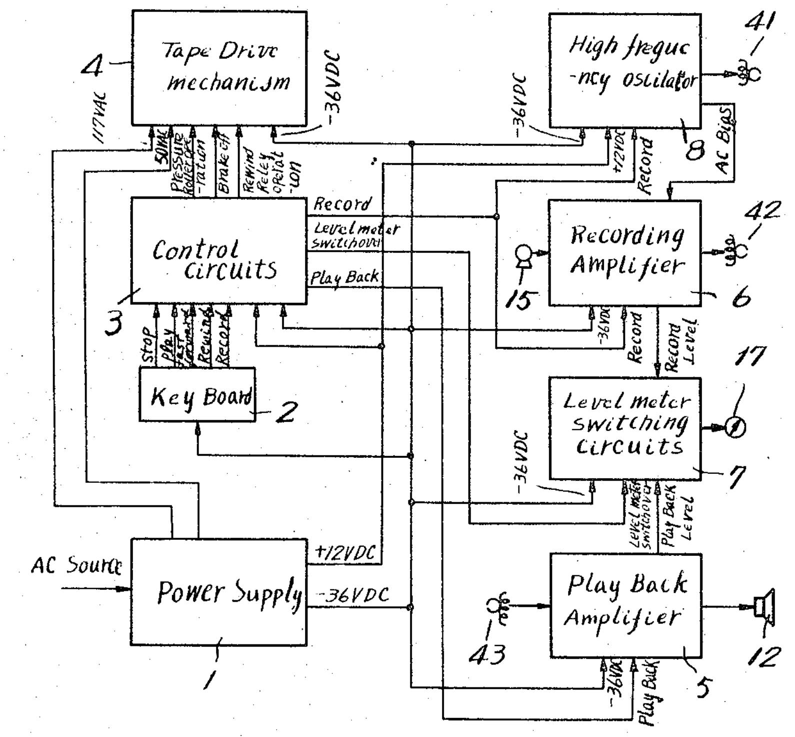
FIG. 1 is a block diagram of a control circuit system for a magnetic recorder illustrating the present invention.
Figure 12:
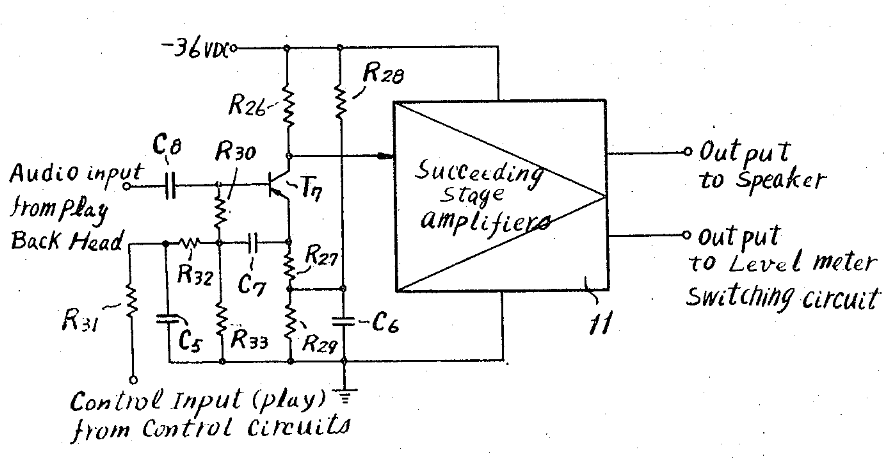
Figure 9:
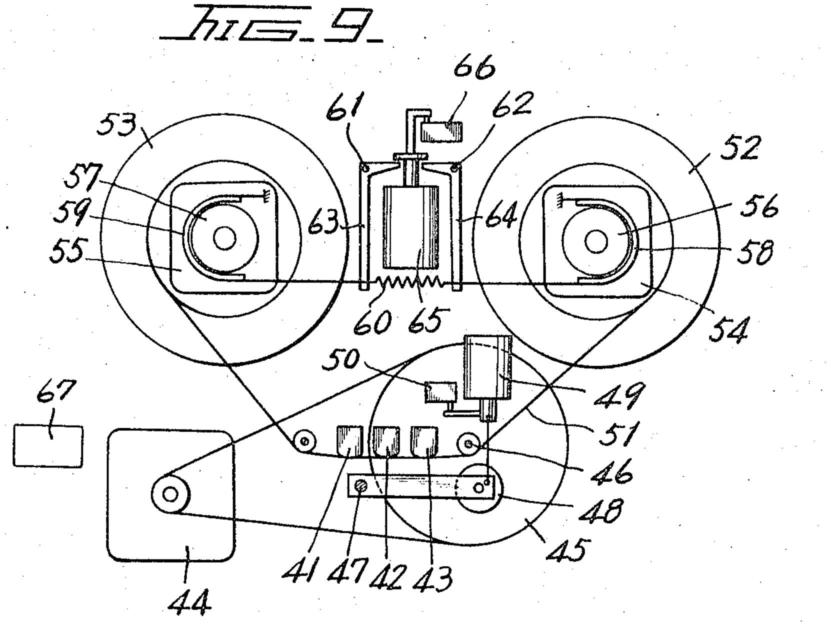
Figures 10, 11:
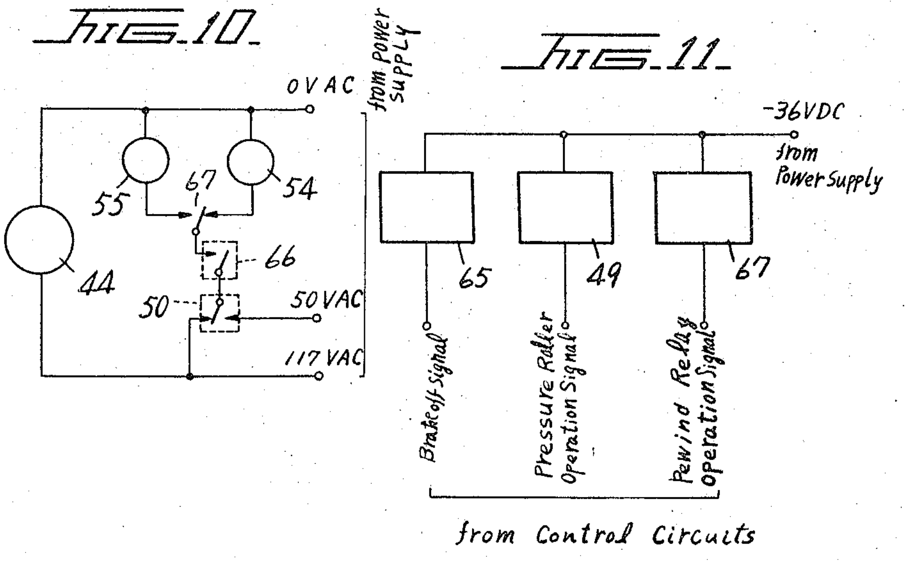
Figure 13:
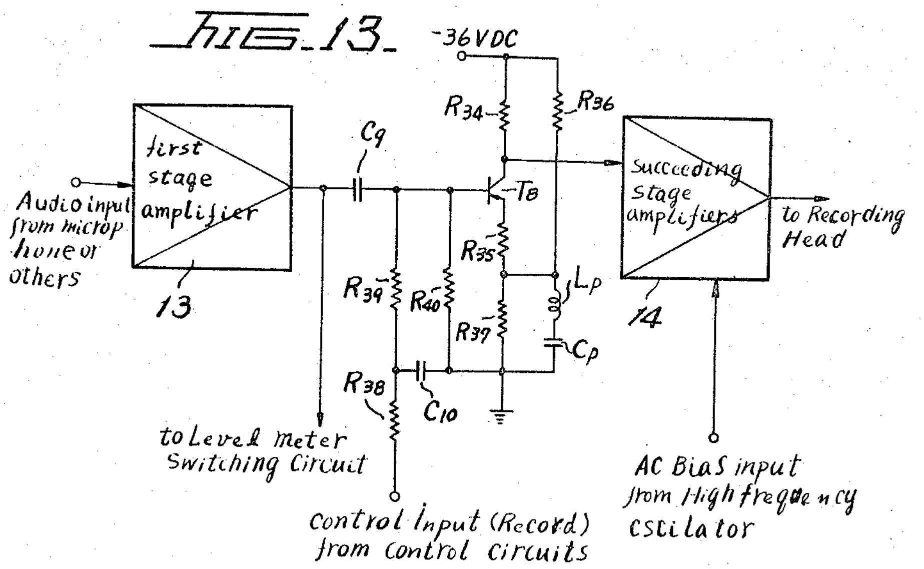
Figures 14, 15:
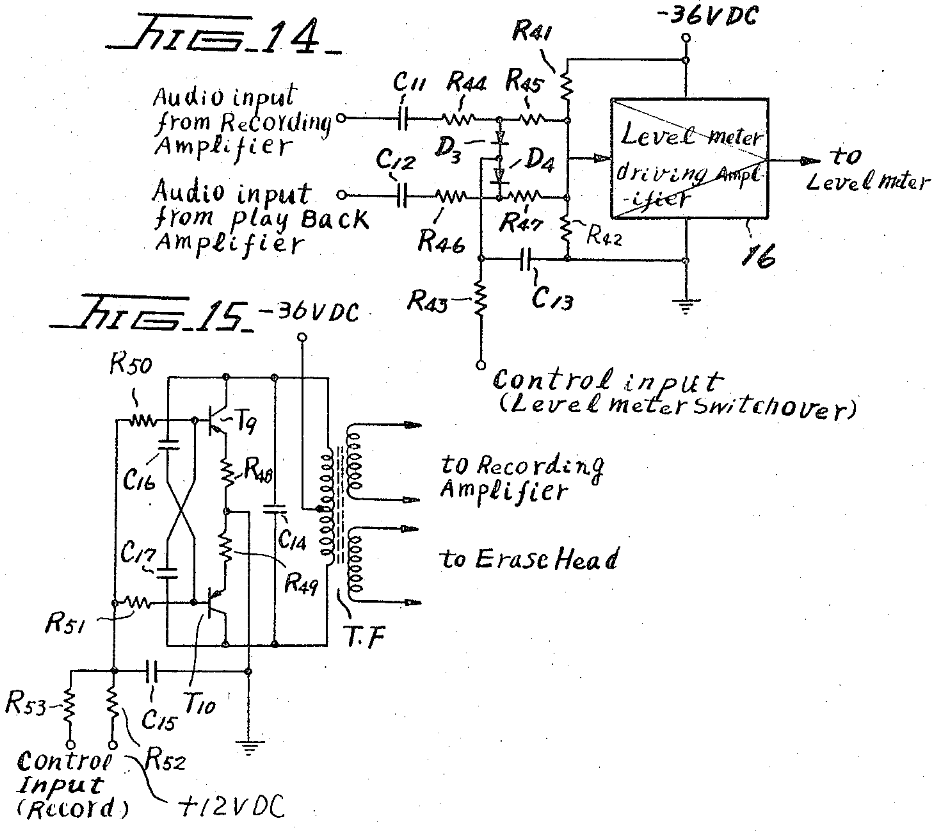

FIGS. 9 through 15 are detailed views of various devices schematically illustrated in FIG. 1 in which FIG. 9 is a block diagram of the tape drive mechanism, FIGS. 10 and 11 show respectively the motor circuit and control circuit for the tape drive mechanism of FIG. 9, respectively, FIG. 12 is a play-back amplifier circuit, FIG. 13 is a recording amplifier circuit, FIG. 14 is a lever meter switching circuit, and FIG. 15 is a high frequency oscillator circuit.

As seen from FIG. 1, the control circuit system of the present invention comprises generally a power supplying 1 for supply DC or AC current at a suitable magnitude of voltage to various circuit devices in said system, a key board 2 for signaling five types of functions such as "play," "record," "fast forward," "rewind" and "stop," a control circuit 3 which memorizes a selected one of said signals and applies a signal to the succeeding circuit in conformity with said memorized signal for actuating said magnetic recorder, a tape drive mechanism 4 which actuates in accordance with the signal from said control circuit 3, a play-back amplifier 5 and a recording amplifier 6 which actuates in accordance with different signals from said control circuit 3, respectively, a level meter switching circuit 7, and a high frequency oscillator 8.

Figure 3:
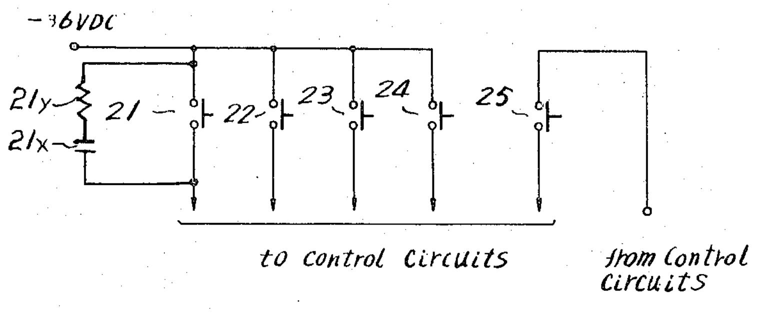
FIG. 3 is a circuit diagram of the key board shown in FIG. 1.

The power supply 1 is designed to supply necessary current to various circuit devices which constitute the novel control circuit system. The power supply 1 generates two types of DC power at −36 v. and +12 v. through an ordinary transformer and a rectifier and two types of AC power at 117 v. and 50 v. and apply thus generated power to the above mentioned various circuit devices. Of course, these values of voltage are only illustrative and these voltage values may vary depending upon the type of circuit devices incorporated in the control circuit system. And when a NPN type transistor is employed in each circuit device, the polarity of current should be, of course, reversed. The key board 2 comprises five push button switch-type opening and closing means, that is, a stop key 21, a play back key 22, and rewind key 23, a fast forward key 24, and a record key 25 as shown in FIG. 3. The keys other than the record key 25 feed −36 DC to the respective input terminals of the control circuit 3 as signed voltage. The record key 25 may feed a signal "record" (minus potential) only when the record key receives a signal "record" from the control circuit 3. This is for the caution's sake that the recorded tape may not be erased by accident.

Figure 2:
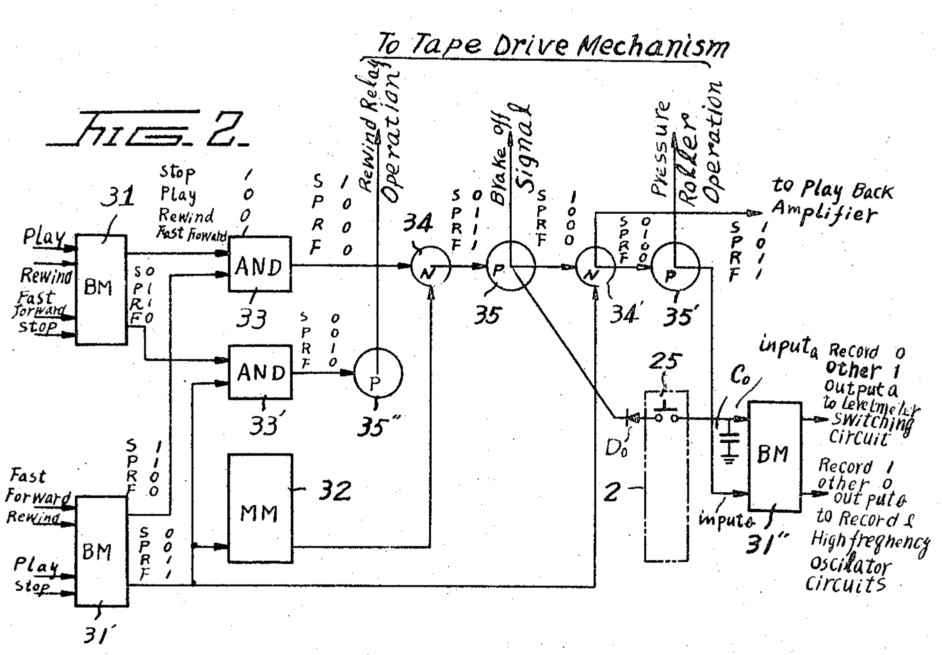
FIG. 2 is a logical diagram of the control circuit system as shown in FIG. 1.

The control circuit 3 comprises the logical circuit as shown in FIG. 2. In this figure, bistable multivibrators (flip-flop circuit) are indicated by numerals 31, 31′ and 31″, respectively a monostable multivibrator (one shot multivibrator) is indicated by numerals 32, AND circuits are indicated by numerals 33 and 33′, respectively, NOR circuits are indicated by numerals 34 and 34′, and power transistors are indicated by numerals 35, 35′ and 35″, respectively.

Figure 4:
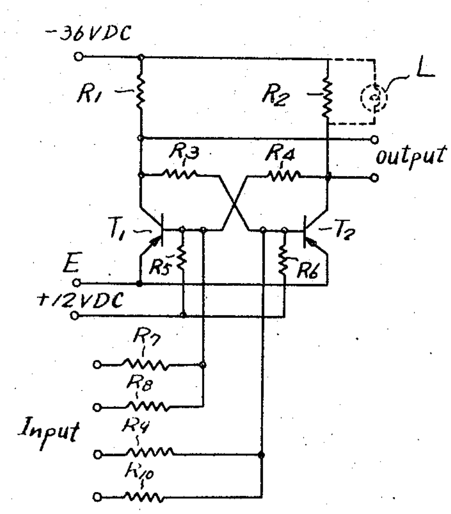

Each of the bistable multivibrators 31, 31′ and 31″ is an ordinary circuit comprising two transistors T1 and T2 and ten resistors R1 through R10 combined as shown in FIG. 4 and is adapted to memorize different signals coming at its four input terminals and then develops signals at its output terminals.

Figure 5:
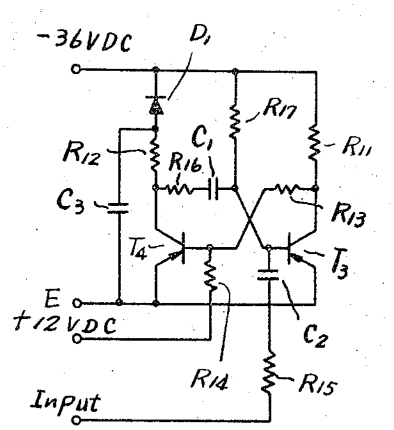

The monostable multivibrator 32 comprises two transistors T3 and T4, seven resistors R11 through R17, three condensers C1 through C3, an a diode D, as shown in FIG. 5 and is designed to provide an output for a predetermined period when the input has changed from 1 (minus potential) to 0 (no minus potential). The term "input 1" or "output 1" used herein refers to input or output which has been applied at a certain magnitude of potential thereon whilst the term "input 0" or "output 0" refers to input or output which has been applied with no potential thereon.

The above monostable multivibrator 32 is substantially the same as an ordinary circuit for the purpose except that the novel monostable multivibrator is provided with a diode D1, a condenser C3, and a resistor 16 for the prevention of any miss operation. The diode D1 and condenser C3 are for the prevention of any misoperation due to variation in the voltage value at the power supply source. When the voltage at the power supply drops suddenly, for instance, from −36 v. to −35 v., the diode D1 and condenser C3 prevent the circuit from being energized notwithstanding of no input being supplied thereto. The provision of the resistor 16 is for the prevention if improper function of the monostable multivibrator due to a substantial current leakage when the polarity of voltage to be applied to the timing condenser which is of a chemical condenser.

Figures 6, 7, 8:
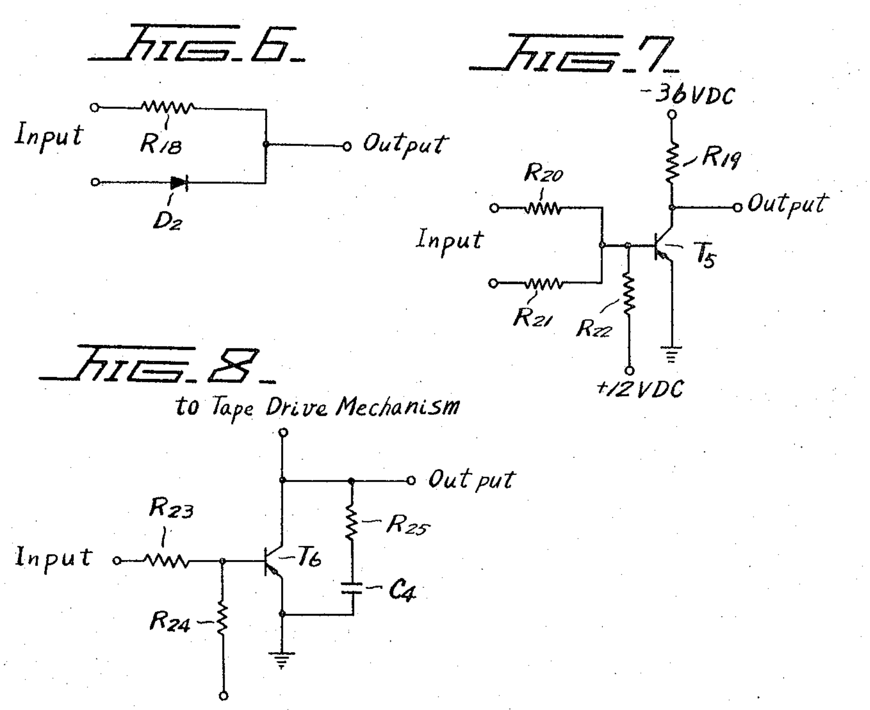

Each of the AND circuits 33, 33′ comprises a resistor R18 and a diode D2 as shown in FIG. 6 and when either its two inputs are 1 (minus potential), its output is also 1 (minus potential).

Each of the NOR circuits 34, 34′ is an ordinary circuit comprising a transistor T5 and three resistors R20 through R22 as shown in FIG. 7, and when either of the inputs are 0 (no minus potential), its output is 1 (no minus potential).

Each of the power transistor circuits 35, 35′ and 35″ comprises a power transistor 6, three resistors R23 through R25 and a condenser C4. Each power transistor circuit is adapted to drive a brake-off solenoid 65, a solenoid 49 which presses a pressure roller 48 against a capstan 46, and a rewind relay 67, respectively, as shown in FIG. 9. In other words, when the input is 1 (minus potential), the above solenoids 65, 49 and the rewind relay 67 which are respectively connected to the collectors of the three power transistor circuits 35, 35′ and 35″ are respectively energized.

The tape drive mechanism 4 comprises a capstan motor 44, a take up motor 54, a rewind motor 55, and control means for effecting the rotation and stop of these motors, respectively as shown in FIG. 9. The tape drive mechanism 4 is installed in a magnetic recorder which comprises an erase head 41, a recording head 42 and a play back head 43 which is also shown in FIG. 9. The electric circuit of the tape drive mechanism 4 is shown in FIGS. 10 and 11. The capstan motor 44 is continuously rotating and imparts its motion through a belt to a flywheel 45 which in turn drives a capstan 46. A pressure roller 48 is pivoted at 47 and the roller is movable so as to contact with and withdrawn from the capstan 46. The pressure roller 48 is connected to the plunger of the pressure roller solenoid 49. When the pressure roller solenoid is energized, the pressure roller 48 is pressed against the capstan 46 and at the same time a micro motor 50 is actuated. The take up reel and supply reel for winding the recording tape are indicated by numerals 52, 53, respectively. The take up motor 54 and rewind motor 55 have reel hubs 56, 57 provided with brake shoe 58, 59, respectively. The brake shoes 58, 59 are connected to each other through connecting wires by means of a spring 60. The opposite ends of said wires are connected to respective brake arms 63, 64 which outwardly pivot around the respective pivot pins 61, 62. When the brake off solenoid 65 is energized, the brake shoes 58, 59 are released and at the same time a micro switch 66 is energized. When the control circuit is applied with a signal "play," "rewind" or "fast forward," the brake off solenoid 65 actuates in accordance with such a signal from the control circuit thereby to cause the brake off solenoid plunger to descend. The descending movement of the plunger causes the brake arms 63, 64 to pivot outwardly, respectively whereby the brake shoes 58, 59 are loosened against the action of the spring 60 resulting in releasing their braking force on the reel hubs 56, 57, and at the same time the micro switch 66 is energized to supply power to the reel motor circuit.

The pressure roller solenoid 49 is energized at a signal from the control circuit 3 when the magnetic recorder is in a "play" condition and thus energized solenoid causes the pressure roller 48 to come into contact with the capstan 46 so as to pinch the recording tape 51 between the roller and capstan and at the same time to energize the micro switch 50 which in turn supplies voltage at a value (in this case 50 v.) lower than a rated voltage to the take up motor 54 whereby the tape is driven under a suitable tension. When the micro switch is not energized, the reel motor (take up motor) 54 is supplied with a rated voltage (in this case 117 v.) whereby the recorder is conditioned for the "fast forward") operation. The rewind relay 67 is energized upon receiving a signal from the control circuit 3 when the recorder is in the "rewind" condition whereby the application of voltage to the take up motor 54 is cutoff and power is supplied to the rewind motor 55.

The play back amplifier 5 comprises an initial amplification stage circuit having a transistor T7, eight resistors R26 through R33, and four condensers C5 through C8, and a second amplification stage circuit as seen in FIG. 12. When the play back amplifier receives a signal "play" from the control circuit 3, the amplifier amplifies the audio signal from the play back head 43 and applies thus amplified signal to a speaker 12 and at the same time applies the audio signal at a suitable level to a level meter switching circuit 7.

The signal "play" from the control circuit 3 has a value of 1 or minus voltage, and accordingly, a bias current is supplied to the base of the transistor T7. In other words, after the signal voltage which had passed through the input resistor R31 has been removed noise components therefrom by means of a bypass condenser C5, the voltage is applied through the voltage divider resistors R32, R33 and the resistor R30 to the base of the transistor T7. The resistor R27 is connected at its one terminal through the condenser C7 to the emitter of the transistor T7 whereby the impedance as seen at the audio input side becomes high. In this way, the audio signal from the play back head 43 is amplified with a flat frequency response. The other circuit components function in the same manner as in any ordinary amplifying circuit. The second and succeeding amplifying circuits may be selected from any known suitable ones if they are capable of applying any siutable level of audio signal to the speaker 12 and level meter switching circuit 7.

The recording amplifier 6 comprises a transistor T8, seven resistors R34 through R40, two condensers C9, C10, a circuit comprising an inductance L*p* and a condenser C*p* which constitutes a series resonance circuit, an initial amplifying stage 13 and the succeeding amplifying stage 14. The recording amplifier 6 firstly amplifies an audio signal from a microphone 15 or any other audio frequency source at its initial amplifying stage 13 and feeds thus amplified audio signal to the level meter switching circuit 7 and at the same time feeds the thus amplified audio signal to any suitable succeeding amplifying stage 14 in accordance with a signal "record" from the control circuit 3. The succeeding amplifying stage 14 amplifies the audio signal to a level suitable to be fed to the recording head 42 and then mixes the amplified audio signal with AC bias current from the high frequency oscillator and feeds the mixture to the recording head 42.

The signal "record" from the control circuit 3 is at a minus potential and passes through the input and resistor R38 and said signal has noise components removed therefrom by the bypass condenser C10. The signal is then rendered to a suitable voltage value by the voltage divider R39, R40 and supplies a suitable bias current to the base of the transistor T8. The other circuit components are the same as those in any ordinary recording amplifier and the series resonance circuit constituted by the inductance L*p* and condenser C*p* also serves as an audio high frequency compensation circuit.

The level-meter switching circuit 7 comprises a circuit having two diodes D3, D4, seven resistors R41 through R47, three condensers C11 through C13, and a level meter drive amplifier 16 as shown in FIG. 14. The circuit 7 selects either one of two audio inputs, that is, the output from the recording amplifier 8 or that from the play back amplifier 5, in accordance with any signal from the control circuit 3 and amplifies the selected output to an appropriate voltage and rectifies the amplified output, and then applies the rectified output to the level meter 17.

The signal voltage from the control circuit 3 is an earth potential when a recording level is indicated whilst the signal voltage is a fixed minus voltage when a play back level is indicated. Accordingly, when a recording level is indicated, reverse voltage is applied to the diode D3 and the diode is cut off and the audio signal from the recording amplifier is fed through the condenser C11, and resistors R44, R45 to the amplifier 17 where the signal is amplified and rectified to a magnitude suitable to energize the level meter 18. On the other hand the audio signal from the play back amplifier 5 passes through the condenser C12, resistance R46 and then through the diode D4 and is bypassed through the condenser C13 since the diode D4 is in a conductive condition by the application of forward voltage thereto, and the signal which reaches the amplifier 16 via the resistance R47 is too weak to affect on the indication for level recording.

In order to signal a play back level, the diode D3 is rendered conductive while the diode D4 is cut off. The level meter 17 is supplied with a signal for switching before the recording amplifier initiates the operation, and accordingly, prior to the recording operation the volume control of the recording amplifier 6 can be adjusted to a suitable level.

The high frequency oscillator 8 comprises two transistors T9, T10, six resistors R48 through R53, four condensers C14 through C17, and an output transformer TF as seen in FIG. 15. The high frequency oscillator is adapted to initiate oscillation on a signal "record" from the control circuit 3 and supply erasing current to an erase head 41 and AC bias current to the recording amplifier 6. The signal "record" from the control circuit 3 is a signal at a minus voltage and supplies bias current through the resistors R53 and R50 to the bases of the two transistors T9 and T10 of the push pull oscillator. When the signal "record" is absent, because of the plus voltage supplied via the resistor R52, the bases of the two transistors T9 and T10 are maintained at a plus potential and no bias current flows through the bases, and accordingly the high frequency oscillator 8 does not oscillate.

Explanation will now be made on the operation of the logical diagram shown in FIG. 2. When any one of various signals such as "stop," "play," "rewind," "fast forward" is simultaneously applied from the key board 2 to the pair of bistable multivibrators 31, 31', the multivibrators memorize the signal and then develop binary output signals indicated with symbols St. 1, Pl. 1, Re. 1, and Fa. 1. These symbols are used to mean that minus voltages are being applied at the input or output sides of the logical circuits when the magnetic recorder is in the respective conditions "stop," "play," "rewind," and "fast forward," respectively. And St. 0, Pl. 0, Re. 0, and Fa. 0 are used to mean no minus voltage are being applied on the input or output sides of the logical circuits when the recorder is in one of the above conditions, respectively.

The output signals from the pair of bistable multivibrators 31, 31′ are applied to the pair of AND circuits 33, 33′. When the respective two input terminals of the paired AND circuits are simultaneously applied with the identically symbolized signal, the same symbolized signal is developed at one output terminal of the two AND circuits. Accordingly, when the identically symbolized signal is simultaneously applied at each of the input terminals of the AND circuit 33 by the bistable multivibrators 31, 31′, the same symbolized one signal is developed at one output terminal of the circuit and thus developed output signal is applied to the NOR circuit 34. And when the identically symbolized signal is simultaneously applied at each of the input terminals of the AND circuit 33′ by the bistable multivibrators 31, 31′, the same symbolized one signal is developed at one output terminal of the circuit and this output signal is then applied to the power transistor 35″.

When the NOR circuit 34 is not applied at its input side with an inhibit signal from the monostable multivibrator 32, an output signal different from the input signal is developed at its output side and this output signal is applied to the transistor circuit 35. The power transistor circuit 35 develops at its output side an output signal different from the signal at its input side and a portion of said output signal is applied to the NOR circuit 34′ and another portion of the output signal is applied through the diode $D_0$ and record key 25 to one input terminal *a* of the bistable multivibrator 31″ for recording control. Next, the NOR circuit 34′ develops at its output terminal an output signal different from the signal at its input side and this output signal is applied to the power transistor circuit 35′. The power transistor develops at its output side an output signal different from the signal at its input side and this output signal is applied to the other input terminal *b* of the bistable multivibrator 31″. Since the signals to be applied from the three power transistor circuits 35, 35′ and 35″ to the tape drive mechanism are earth signals, if the power transistor circuits are respectively connected with one terminal of the respective brake off solenoid 65, pressure roll solenoid 49 and rewind relay 67 and the other terminals of said solenoids 49, 65 and relay 67 are connected with the minus terminal of the power supply 1, these solenoids and relay may be energized. In other words, the brake off solenoid 65 release the brake shoe 58 except when the magnetic recorder is in the "stop" condition. When the recorder is in the "play back" condition, the pressure roller solenoid 49 causes the pressure roller 48 to contact with the capstan 46 whereby the tape is pinched between the pressure roller 48 and capstan 46 and driven at a predetermined speed.

The rewind relay 67 is energized when the recorder is in the "rewind" condition and applies AC voltage to the rewind motor 55. The output signal from the NOR circuit 34′ is 1 when the recorder is in the "play" condition and this AC voltage is applied to the play back amplifier 5 to energize the amplifier. When the input to be applied to the monostable multivibrator 32 changes from 1 to 0, that is, when the recorder changes its operative condition from "rewind" or "fast forward" to "play back" or "stop," the multivibrator develops an output signal having a magnitude of 1 for a predetermined period (about 0.5 sec.). When this magnitude of output signal is applied to the input side of the NOR circuit 34, the output from the NOR circuit 34 maintains the value of 0 during the output signal from the multivibrator 32 is being applied thereto, and accordingly, the various devices following the NOR circuit 34 are deenergized for a certain period and the tape also terminates its movement. Therefore, even when the play back key 22 is depressed so as to change the operative condition of the recorder from "rewind" or "fast forward" in which the tape is running fast to "play back," since the devices following the NOR circuit 34 assume the "play back" condition through an intermittent pause period, the tape will not be placed under an abnormal tension, which is quite advantageous when the magnetic recorder is employed for automatically playing music over and again. For the purpose, a silver contact paper, for example, is attached at the beginning end and terminating end of the tape and the silver contact papers cause the switch contact to shortcircuit whereby to make the rewind and play back signals and the recorder may automatically repeat "play," "rewind," "stop" and "play" in the order. And the repeat signal may be applied to only the NOR circuit 34′ because the NOR circuit 34 is in the same condition in either case of "play" and "rewind."

The output of the power transistor circuit 35 is applied through the diode $D_0$ to the key board 2 and becomes a permission signal to allow to record. In other words, when the output of the power transistor circuit 35 has a magnitude of 1 (minus potential), that is, when the magnetic recorder is not in the "stop" condition, even the record key 25 is depressed, no signal is applied to the bistable multivibrator 31″. Accordingly, even when the record key 25 is depressed while the operation of the recorder is in operation, the bistable multivibrator 31″ will not actuate, and therefore, the recorded tape will not be erased.

When recording is made, the record key 25 is first depressed maintaining the recorder in the "stop" condition and then the play back key 22 is depressed while maintaining the record key in the depressed condition. Of course, after the recorder has initiated its intended recording operation, the record key 25 may be released. When the record key 25 is depressed an output signal having a magnitude of 1 is applied to the input terminal *a* of the bistable multivibrator 31″ and the output terminal *b* of the multivibrator has an output having a magnitude of 0 and the record indicator lamp L and a signal is applied to the level meter switching circuit 7 thereby the level meter indicates a suitable level to the recording amplifier 6. In order to make the recording level a suitable value for the recording operation, the volume control of the recording amplifier is adjusted. Since in the above condition the play back key 22 has not yet been depressed and the input terminal *b* of the bistable multivibrator 31″ is also being applied an input signal having a magnitude of 1, the output terminal *b* of the multivibrator 31″ maintains to have an output signal having a magnitude of 0, and neither the high frequency oscillator 8 nor the recording amplifier 6 has not been yet energized. Accordingly, even if the record key 25 is unintentionally depressed while the recorder is in the "stop" condition, the recorded tape will be free from any recording signals.

When the play back key 22 is depressed while maintaining the record key 25 in the depressed condition, the output signals of the power transistor circuits 35, 35′ become to have a value of 1, but the input terminal *a* of the bistable multivibrator 31″ maintains a value of 1 because the electric charge which has been applied to the condenser C is continuously applied to the input terminal though for a brief period, and accordingly, one terminal *a* of the bistable multivibrator 31″ has a value of 0 and the other terminal *b* thereof has a value of 1 as shown in FIG. 2 and the terminal *a* applies a signal to the high frequency oscillator 8 and the terminal *b* applies a signal to the recording amplifier to energize them respectively. The diode D serves to prevent the electric charge storaged in the condenser C from flowing reversely to the power transistor circuit 35 when the output terminal of the power transistor 35 becomes to have a value of 0.

In order to initiate the operation of the novel control circuit, the pair of bistable multivibrators should be caused to previously memorize the signal "stop" state. For attaining the above purpose, a circuit which connects a condenser $21_x$ and a resistor $21_y$ is connected in parallel to the stop key 21 of the key board (FIG. 3). Consequently, when the novel control circuit is connected to the power supply voltage, transient current is supplied to the bistable multivibrators 31, 31' and the signal "stop" state is stored in the multivibrators.

An example in which the transistor circuits are employed in constituting the logical circuit has been explained hereinabove and illustrated in the drawings, but some of the transistor circuits may be substituted by vacuum tube circuits and/or relay circuits and such changes are also within the scope of the present invention as properly set forth in the appended claims.

What is claimed is:

1. A control device for a magnetic recorder which comprises a key board having five push button type keys, said keys being designed to develop "play back," "record," "fast forward," "rewind" and "stop" signals, respectively, a pair of bistable multivibrators memorizing signals developed by said key board other than a "record" signal and developing binary signals at the output terminals of said multivibrators, and a logical circuit assembly applying said binary signals from said bistable multivibrators to its logical circuits and selecting a desired output signal, said logical circuit assembly comprising first and second AND circuits, means applying the output signal from said first AND circuit to the input terminal of a first power transistor circuit which energizes a rewind relay, means applying the output signal from said second AND circuit to the input terminal of a second power transistor circuit which energizes a brake off solenoid through a first NOR circuit, means applying portion of the output signal of said second power transistor circuit to the input terminal of a second NOR circuit which actuates a play back amplifier, means applying the output signal of said second NOR circuit to the input terminal of a third power transistor circuit which energizes a pressure roller solenoid, a third bistable multivibrator memorizing "record" signals developed by said key board and having two input terminals, and means applying the output signal of said third power transistor circuit to one input terminal of said third bistable multivibrator and applying a portion of the output signal of said second power transistor circuit to the other input terminal of said third bistable multivibrator through a diode and said record key.

2. A control device for a magnetic recorder as set forth in claim 1, further comprising a tape drive mechanism, a control means including said rewind relay for switching between the rewind motor and take-up motor of the tape drive mechanism, a control means having a microswitch which cooperates with the plunger of said brake off solenoid for effecting the opening and closing of a common power source circuit for said rewind motor and take-up motor, and a control means having a microswitch which cooperates with the plunger of said pressure roller solenoid for switching said power source circuit for supplying high voltage or low voltage to said rewind motor and take-up motor.

3. A control device for a magnetic recorder as set forth in claim 1, further comprising a condenser connected in parallel with said stop key, the charging current of said condenser being utilized causing said pair of bistable multivibrators to memorize the "stop" signal at an initial operation stage of the control device after the device has been connected to the power supply source.

References Cited

UNITED STATES PATENTS

| | | | |
|---|---|---|---|
| 2,930,855 | 3/1960 | Blakistone | 179—100.2 |

BERNARD KONICK, *Primary Examiner.*

J. R. GOUDEAU, *Assistant Examiner.*